2,975,099
POLYETHYLENE GLYCOL SUPPOSITORY BASES

Jere E. Goyan, Ann Arbor, and Milton Wruble, Kalamazoo Township, Kalamazoo County, Mich., assignors to The Upjohn Company, Kalamazoo, Mich., a corporation of Michigan No Drawing. Filed June 25, 1958, Ser. No. 744,345

6 Claims. (Cl. 167—64)

This invention relates to an improved base for shaped pharmaceutical preparations and more particularly to a base which possesses chemical and physical properties which render it admirably suitable in extrusion processing, readily dispersible in water, and storage-stable. It also relates to shaped medicinal preparations utilizing said base.

Shaped pharmaceutical preparations are generally classified as to the type of base and as to the method of manufacture. Among the bases are the oleaginous type, for example, cacao butter; the water-dispersible type, for example glycerin, gelatin and polyethylene glycols and their derivatives; and the soap type, for example, castile soap. Among the methods of manufacture are hand-rolling, pour-molding, pressure-moulding, and extrusion-moulding.

There are certain disadvantages associated with the aforementioned bases. Cacao butter lacks storage-stability under warm conditions and often becomes rancid. Uncontrolled absorption of the medicament accompanying the cacao butter is not unlikely. Glycerin and gelatin bases tend to lose moisture and become less soluble during storage. The high molecular weight polyethylene gylcols lack lubricity and often produce quite brittle shaped preparations. The soap-based shaped preparations have an extremely limited field of usefulness. Hand-rolling of shaped preparations is a costly, small unit operation not adaptable to large scale manufacturing. Pour-molding requires elevated temperatures to ensure the easy flow of the ingredients into the mold and is thus unsatisfactory for shaped preparations containing active ingredients susceptible to elevated temperatures. Although pressure-molding is widely used and is often satisfactory, nevertheless, such a method leaves much to be desired in the way of economy and ease of large-scale production. The method of extrusion-molding offers the reduced costs and the increased production which have been long-sought in the field of shaped pharmaceutical preparations. However, the effect of the heat produced during the extrusion step, the necessity for the presence of lubricating properties without compromising firmness, and the amount and combination of inert solid adjuvants critical to water-dispersibility and to extrudability have presented unsolved problems in the field of extrusion-molding of shaped pharmaceutical preparations. These problems have resisted solution by methods and formulations known in the art until the instant invention.

It is an object, therefore, of the instant invention to provide a base for shaped pharmaceutical preparations which is free from the prior art problems encountered in extrusion-molding. Another object is to provide such a base which is water-dispersible. An additional object is to provide a storage-stable base for shaped pharmaceutical preparations. Yet another object is to provide such a base which is compatible with a wide variety of active medicaments. Additional objects will be apparent to those skilled in the art to which this invention pertains.

The foregoing and additional objects have been accomplished by the provision of a pharmaceutical base suitable for shaping by extrusion and comprising a solid polyethylene glycol of molecular weight from about 4000 to about 6000; a liquid polyethylene gylcol soluble in said solid polyethylene glycol; a non-toxic, nonionic solid oil-soluble surfactant; spermaceti, a non-toxic, nonionic solid water-soluble surfactant; and a non-toxic, solid adjuvant mixture of which between about eighty percent and about ninety percent by weight is water-soluble. The physical properties of the various individual ingredients, by interaction, contribute to the properties of the formulated composition the characteristics which guarantee extrudability, water-dispersibility and storage-stability.

The amounts and proportions of the various ingredients of the base will naturally vary with the amounts of the medicinal ingredients incorporated therein. However, it has been found that the following ranges of the base ingredients are satisfactory for most purposes:

| Ingredient | Percent of Base by Weight |
|---|---|
| Solid polyethylene glycol | about 23 to about 35. |
| Liquid polyethylene glycol | about 10 to about 13. |
| Solid oil-soluble surfactant | about 9 to about 11. |
| Spermaceti | about 10 to about 12. |
| Solid water-soluble surfactant | about 4 to about 6. |
| Solid adjuvant | about 26 to about 40. |

The preferred solid polyethylene glycol has a molecular weight of about 6000; however, the molecular weight can vary from about 4000 to about 6000. Said glycols are referred to as P.E.G. 4000 and P.E.G. 6000. The preferred liquid polyethylene glycol has a molecular weight of about 400; however, the molecular weight can vary from about 200 to about 600. Said glycols are referred to as P.E.G. 200, P.E.G. 400 and P.E.G. 600. The preferred oil-soluble surfactant is polyoxyethylene sorbitan monostearate (Tween 61); however, polyoxyethylene sorbitan tristearate (Tween 65) can be used. The preferred water-soluble surfactant is an ethylene oxide-polypropylene gylcol condensation product of the formula.

$$HO(C_2H_4O)(C_3H_6O)(C_2H_4O)H$$

with a polypropylene-base molecular weight of about 1750 and a total molecular weight of about 8750 (Pluronic F-68); however, other non-toxic, nonionic, solid, water-soluble surfactants can be used, for example, polyoxyethylene stearate (hydrophile-lipophile balance Number 16.9, Atlas G-2152) and polyoxyethylene palmitate (hydrophile-lipophile balance Number 15.5, Atlas G-2079). Of the solid adjuvant, the amount of water-soluble component can vary from about eighty percent to about ninety percent by weight. Beta lactose is preferred as the water-soluble adjuvant. However, sucrose, dextrose, sodium chloride and sodium sulfate, for example, can be substituted in whole or in part therefor. The balance of the adjuvant is preferably corn starch. However, the starch can be mixed with small amounts of methylcellulose, guar gum, or purified wood cellulose.

The amounts and proportions of the medicament or medicaments to be incorporated into the base will naturally vary with the specific medicament and the treatment required, for example, local or systemic treatment. For most purposes from about 0.5 percent to about five percent by weight of the final shaped composition is satisfactory; however, up to about twelve percent by weight of the medicament can be used.

The general method for preparation of the base involves the utilization of heat to form a warm mixture of the higher-melting point ingredients. To this warm mixture is added a dispersion of the medicinal ingredients, as desired, and the inert solid adjuvants in the liquid propylene glycol, and the whole is mixed until uniform.

The composition can be refrigerated prior to extrusion-molding without imparting any extrusion-molding resistant properties thereto.

Various medicinal ingredients can be incorporated into the base composition. The said ingredients and mixtures thereof depend on the required type of the finished composition; for example, preparations for nasal, urethral, vaginal and rectal insertion; and the type of medication required, for example, local and systemic medication. Thus, the following medicinal ingredients and appropriate mixtures thereof can be incorporated into the novel composition of this invention: steroids, for example, estrone, testosterone, progesterone, hydrocortisone, prednisolone, 6-methylprednisolone, and the therapeutically active derivatives thereof; hypnotics and sedatives, for example, phenobarbital, pentobarbital, amobarbital, and the like, and their therapeutically active derivatives; antibiotics, for example, neomycin bacitracin, polymyxin, erythromycin, tyrothricin, gramicidin, combinations of these and their therapeutically active derivatives; diuretics, for example, aminophylline and theophylline; contraceptives and trichomonicides, for example, phenylmercuric acetate, sodium lauryl sulfate, oxyquinoline benzoate, and the like; antiseptics and bactericidal agents, for example, hexachlorophene, hexylresorcinol, nitrofurazone, myristyl-gamma-picolinium chloride, sulfadiazine, phenol, secondary amyltricresols; anaesthetics, for example, benzocaine, procaine, tetracaine; vasoconstrictors, for example, epinephrine, phenylephrine and their therapeutically active salts; analgesics, for example, caffeine and ergotamine tartrate, acetylsalicylic acid, acetophenetidin, N-acetyl-p-aminophenol, and the like; narcotizing medicaments, for example, morphine, dihydromorphinone, scopolamine, codeine, and the like.

The experimental and test data on bases of varying compositions are summarized in Tables I and II.

TABLE I

Bases for extrusion molding
[Figures are percent by weight]

|  | A | B | C | D | E | F | G | H |
|---|---|---|---|---|---|---|---|---|
| Tween 60 |  | 2 |  |  |  |  |  |  |
| Tween 61 | 15 |  |  |  |  |  | 25 | 23 |
| Spermaceti |  |  |  |  | 3 |  |  |  |
| P.E.G. 4000 | 75 | 74 | 74 | 69 | 80 | 80 |  |  |
| Pluronic F-68 |  |  | 9 | 9 | 10 | 10 |  |  |
| Polyethylene sorbitol beeswax derivative |  |  |  |  |  | 1 |  | 15 |
| Corn starch |  |  |  |  |  |  | 20 | 25 |
| Cane sugar |  |  |  |  |  |  | 20 | 30 |
| Tween 20 |  | 2 |  |  |  |  | 5 | 7 |
| Propylene glycol | 10 | 7 | 5 | 5 | 3 | 4 |  |  |
| Zinc oxide |  | 2 | 3 | 3 |  |  | 15 |  |
| Glycerol monolaurate |  | 9 | 5 | 9 | 4 | 5 |  |  |
| Tegacid regular [1] |  |  |  |  |  |  | 15 |  |
|  | 100 | 97 | 96 | 95 | 100 | 100 | 100 | 100 |
| Behavior in water | Disperses in water. | Good solubility. | Good solubility. | Good solubility. | Disperses in water. | Poor dispersibility. | Fair solubility. | Fair solubility. |
| Extrusion results | Very sticky. | Too sticky. | Too sticky. | Too sticky. | Too sticky. | Fair. | Discoloration. | Too soft. |

[1] A glyceryl monostearate-diethylaminoethyl alkyl amide phosphate emulsifier.

TABLE II

Bases for extrusion molding
[Figures are percent by weight]

|  | I | J | K | L | M | N | O | P |
|---|---|---|---|---|---|---|---|---|
| P.E.G. 6000 |  |  |  |  | 30 | 25 | 23 | 25 |
| Tween 61 | 15 | 20 | 20 | 20 |  |  | 12 | 10 |
| Spermaceti |  |  |  |  |  | 10 | 13 | 19 |
| Pluronic F-68 | 4 |  |  |  | 5 | 5 | 5 | 5 |
| Beta lactose |  |  | 20 | 20 | 40 | 30 | 30 | 30 |
| Titanium dioxide |  |  |  | 5 |  |  | 1 | 1 |
| Polyethylene sorbitol beeswax derivative | 10 |  |  |  |  | 10 |  |  |
| Glycerol monostearate | 15 | 25 | 20 | 25 |  |  |  |  |
| Corn starch | 20 | 15 | 20 | 16 |  | 4 | 4 | 4 |
| Cane sugar | 25 | 21 |  |  |  |  |  |  |
| P.E.G. 400 |  |  |  |  | 21 | 11 | 9 | 11 |
| Tween 20 | 7 | 10 | 10 | 5 |  |  |  |  |
| Propylene glycol |  | 5 | 5 |  |  |  |  |  |
|  | 96 | 96 | 95 | 91 | 96 | 96 | 97 | 96 |
| Behavior in water | Fair | Fair |  |  |  |  |  | Best of the whole series. |
| Extrusion results | Fair | Fair | Sticky | Discolored | Fair | Sticky | Fair | Best of the whole series. |

The data in Tables I and II show that the ingredients are critical to the composition's suitability for extrusion and water-dispersibility. Until the successful composition was formulated, there were repeated failures in either extrusion or water-dispersibility, and in some cases in both of these necessary characteristics. It can be observed that many formulations were too soft, stuck in the extrusion apparatus or discolored. Others failed to meet the requirements of completely dispersing in deionized water within two hours at body temperature.

The following examples are to set forth the best mode contemplated by the applicants of carrying out the subject invention but are not to be construed as limiting.

EXAMPLE 1.—UNMEDICATED BASE

A satisfactory base is prepared from the following types and amounts of ingredients, the parts being given by weight:

| | Parts |
|---|---|
| P.E.G. 4000 | 750 |
| Polyoxyethylene sorbitan tristearate | 300 |
| Spermaceti | 330 |
| P.E.G. 600 | 321 |
| Ethylene oxide-polypropylene glycol condensation product [1] | 150 |
| Beta lactose | 900 |
| Innocuous coloring powder | 15 |
| Starch, bolted | 120 |

[1] Formula $HO(C_2H_4O)_a(C_3H_6O)_b(C_2H_4O)_cH$ wherein $b$ equals 25 to 32 and $a+c$ equals 136 to 138, molecular weight about 8750.

The P.E.G. 4000, polyoxyethylene sorbitan tristearate, spermaceti, and the ethylene oxide-polypropylene glycol condensation product are melted together at 180 to 190 degrees Fahrenheit. The coloring powder, starch and about fifteen percent of the beta lactose are dispersed in the P.E.G. 600. The dispersion is added to the melted mixture. The balance of the beta lactose is added. The whole is stirred and the temperature maintained at 180 to 190 degrees Fahrenheit to ensure smoothness. The completed base is allowed to cool under refrigeration. Such a base is storage-stable, water-dispersible and suitable for extrusion-molding. Preparations shaped from this base by extrusion are unaffected by a temperature as high as 47 degrees centigrade, maintaining their form and rigidity for at least one month at this excessive temperature.

EXAMPLE 2.—UNMEDICATED BASE

Following the procedure of Example 1, a satisfactory base is prepared from the following types and amounts of ingredients, the parts being again given by weight:

| | Parts |
|---|---|
| P.E.G. 4000 | 965 |
| Polyoxyethylene sorbitan tristearate | 300 |
| Spermaceti | 330 |
| P.E.G. 200 | 360 |
| Polyoxyethylene stearate | 150 |
| Sucrose | 725 |
| Coloring powder | 15 |
| Starch, bolted | 100 |
| Purified wood cellulose | 20 |

Preparations shaped from this base by extrusion are unaffected by a temperature as high as 47 degrees centigrade, maintaining their form and rigidity for at least one month at this excessive temperature.

EXAMPLE 3.—MEDICATED PREPARATION

A satisfactory medicated preparation is shaped from the following types and amounts of materials by extrusion-molding; the parts being expressed by weight:

| | Parts |
|---|---|
| P.E.G. 6000 | 750 |
| Polyoxyethylene sorbitan monostearate | 300 |
| Spermaceti | 330 |
| P.E.G. 400 | 321 |
| Polyoxyethylene palmitate | 150 |
| Sodium sulfate | 900 |
| Coloring powder | 15 |
| Starch, bolted | 120 |
| Phenylephrine hydrochloride | 6 |
| Ethyl aminobenzoate | 75 |
| Hydrocortisone acetate, micronized | 15 |
| Neomycin sulfate | 18 |

The P.E.G. 6000, polyoxyethylene sorbitan monostearate and spermaceti are melted together at 180 to 190 degrees Fahrenheit. The coloring powder, starch, about fifteen percent of the sodium sulfate and the four medicinal agents are dispersed in the P.E.G. 400. The dispersion is added to the melted mixture. The balance of the sodium sulfate is added. The whole is stirred at 180 to 190 degrees Fahrenheit to ensure smoothness. The completed mass is allowed to cool sufficiently, then poured into chilled containers which are stored approximately 24 hours under refrigeration prior to extrusion to form shaped preparations weighing three grams each.

This preparation is efficacious in the treatment of rectal conditions involving inflammation and/or infection.

EXAMPLE 4.—MEDICATED SUPPOSITORY

Following the procedure of Example 3, 25,000 medicated suppositories are prepared from the following types and amounts of materials:

| | |
|---|---|
| P.E.G. 6000 | 53 lbs. 4 oz. |
| Polyoxyethylene sorbitan monostearate | 16 lbs. 8 oz. |
| Spermaceti | 18 lbs. 4 oz. |
| P.E.G. 400 | 19 lbs. 12 oz. |
| Ethylene oxide-polypropylene glycol condensation product | 8 lbs. 4 oz. |
| Beta lactose | 40 lbs. |
| Coloring powder | 13 oz. 100 grs. |
| Starch, bolted | 6 lbs 10 oz. |
| Hydrocortisone acetate | 13 oz. 100 grs. |
| Neomycin sulfate | 13 oz. 100 grs. |

These suppositories are unaffected by a temperature as high as 47 degrees centigrade, maintaining their form and rigidity for at least one month. Nevertheless, they disperse completely in water within two hours at body temperature.

EXAMPLE 5.—MEDICATED SUPPOSITORY

Following the procedure of Example 3, medicated suppositories are prepared from the following types and amounts of materials, the parts being given by weight:

| | Parts |
|---|---|
| P.E.G. 4000 | 750 |
| Polyoxyethylene sorbitan monostearate | 300 |
| Spermaceti | 330 |
| P.E.G. 400 | 320 |
| Ethylene oxide-polypropylene glycol condensation product | 150 |
| Beta lactose | 640 |
| Coloring powder | 15 |
| Starch, bolted | 120 |
| Aminophylline | 375 |

Each three-gram extruded suppository contains approximately 0.5 gram of aminophylline. These suppositories are unaffected by temperatures up to 47 degrees centigrade and are readily dispersible in water within two hours at body temperature.

This preparation is useful as a diuretic and as a myocardial stimulant.

It is to be understood that the invention is not to be limited to the exact details of operation or exact compositions shown and described herein, as obvious modifications and equivalents will be apparent to one skilled in the art, and the invention is therefore to be limited only by the scope of the appended claims.

What is claimed is:

1. A pharmaceutical preparation suitable for shaping by extrusion-molding and comprising a polyethylene glycol of the formula $H(OCH_2CH_2)_nOH$ having a molecular weight of from about 4000 to about 6000; a liquid polyethylene glycol of the formula $H(OCH_2CH_2)_nOH$ having a molecular weight of from about 200 to about 600; a member selected from the group consisting of solid polyoxyethylene sorbitan monostearate and polyoxyethylene sorbitan tristearate; spermaceti; a member selected from the group consisting of an ethylene oxide-polypropylene glycol condensation product of the formula $HO(C_2H_4O)(C_3H_6O)(C_2H_4O)H$ with a polypropylene-base molecular weight of about 1750 and a total molecular weight of about 8750, polyoxyethylene palmitate and a solid polyoxyethylene stearate having a hydrophilelypophile-balance value of from about 16 to about 18; and a non-toxic, substantially dry adjuvant mixture of which between about eighty and about ninety percent by weight is water-soluble.

2. The composition of claim 1 which contains in addition a medicament.

3. A pharmaceutical preparation suitable for shaping by extrusion-molding and comprising from about 23 to about 35 percent by weight of a polyethylene glycol of the formula $H(OCH_2CH_2)_nOH$ having a molecular weight of from about 4000 to about 6000; from about ten to about thirteen percent by weight of a liquid polyethylene glycol of the formula $H(OCH_2CH_2)_nOH$ having a molecular weight of from about 200 to about 600; from about nine to about eleven percent by weight of a member selected from the group consisting of solid polyoxyethylene sorbitan monostearate and polyoxyethylene sorbitan tristearate; from about ten to about twelve percent by weight of spermaceti; from about four to about six percent by weight of a member selected from the group consisting of an ethylene oxide-polypropylene glycol condensation product of the formula $HO(C_2H_4O)(C_3H_6O)(C_2H_4O)H$ with a polypropylene-base molecular weight of about 1750 and a total molecular weight of about 8750, polyoxyethylene palmitate and a solid polyoxyethylene stearate having a hydrophile-lypophile-balance value of from about 16 to about 18; and from about 26 to about 40 percent by weight of a non-toxic, substantially dry adjuvant mixture of which between about eighty and about ninety percent by weight is water-soluble.

4. A pharmaceutical preparation shaped by extrusion-molding comprising from about 23 to about 35 percent by weight of a polyethylene glycol of the formula $H(OCH_2CH_2)_nOH$ having a molecular weight of from about 4000 to about 6000; from about ten to about thirteen percent by weight of a liquid polyethylene glycol of the formula $H(OCH_2CH_2)_nOH$ having a molecular weight of from about 200 to about 600; from about nine to about eleven percent by weight of a member selected from the group consisting of solid polyoxyethylene sorbitan monostearate and polyoxyethylene sorbitan tristearate; from about ten to about twelve percent by weight of spermaceti; from about four to about six percent by weight of a member selected from the group consisting of an ethylene oxide-polypropylene glycol condensation product of the formula $$HO(C_2H_4O)(C_3H_6O)(C_2H_4O)H$$

with a polypropylene-base molecular weight of about 1750 and a total molecular weight of about 8750, polyoxyethylene palmitate and a solid polyoxyethylene stearate having a hydrophile-lypophile-balance value of from about 16 to about 18; from about 26 to about 40 percent by weight of a non-toxic, substantially dry adjuvant mixture of which between about eighty and about ninety percent by weight is water-soluble and a medicament.

5. A pharmaceutical preparation shaped by extrusion-molding comprising from about 23 to about 35 percent by weight of a polyethylene glycol of the formula $H(OCH_2CH_2)_nOH$ having a molecular weight of from about 4000 to about 6000; from about ten to about thirteen percent by weight of a liquid polyethylene glycol of the formula $H(OCH_2CH_2)_nOH$ having a molecular weight of from about 200 to about 600; from about nine to about eleven percent by weight of a member selected from the group consisting of solid polyoxyethylene sorbitan monostearate and polyoxyethylene sorbitan tristearate; from about ten to about twelve percent by weight of spermaceti; from about four to about six percent by weight of a member selected from the group consisting of an ethylene oxide-polypropylene glycol condensation product of the formula $HO(C_2H_4O)(C_3H_6O)(C_2H_4O)H$ with a polypropylene-base molecular weight of about 1750 and a total molecular weight of about 8750, polyoxyethylene palmitate and a solid polyoxyethylene stearate having a hydrophile-lypophile-balance value of from about 16 to about 18; from about 26 to about 40 percent by weight of a non-toxic, substantially dry adjuvant mixture of which between about eighty and about ninety percent by weight is water-soluble and from about 0.5 to about twelve percent by weight of a medicament.

6. A suppository shaped by extrusion-molding comprising about 32 percent by weight of a solid polyethylene glycol of the formula $H(OCH_2CH_2)_nOH$ having a molecular weight of about 6000; about twelve percent by weight of a liquid polyethylene glycol of the formula $H(OCH_2CH_2)_nOH$ having a molecular weight of about 400 about ten percent by weight of solid polyoxyethylene sorbitan monostearate; about eleven percent by weight of spermaceti; about five percent by weight of an ethylene oxide-polypropylene glycol condensation product of the formula $HO(C_2H_4O)(C_3H_6O)(C_2H_4O)H$ with a polypropylene-base molecular weight of about 1750 and a total molecular weight of about 8750; about 25 percent by weight of beta lactose; about four percent by weight of starch; about 0.5 percent by weight of titanium dioxide; about 0.5 percent by weight of hydrocortisone acetate; and about 0.6 percent by weight of neomycin sulfate.

References Cited in the file of this patent

UNITED STATES PATENTS

| 2,394,616 | Knoth et al. | Feb. 12, 1946 |
| 2,538,127 | Saunders | Jan. 16, 1951 |
| 2,677,700 | Jackson | May 4, 1954 |
| 2,854,378 | Buckwalter | Sept. 30, 1958 |

FOREIGN PATENTS

| 784,659 | Great Britain | Oct. 16, 1957 |

OTHER REFERENCES

Dolder: Schweizerische Apotheker-Zeitung, vol. 89, No. 22, June 2, 1951, pp. 381–382.

Hassler: J.A.P.A., Pract. Pharm. Ed., vol 14, No. 1, January 1953, pp. 26, 27 and 54.

Pharmaceutical Formulas, 12th Ed., Chemist and Druggist, London (1953), p. 855.

Atlas Catalog of Products for Cosmetic Formulation, 11 p. brochure CD–93.B–3M, July 1957, pp. 6 and 7.

Lesser: Drug and Cosmetic Industry, vol. 69, No. 3, September 1951, pp. 317, 378–9, 396–402.

Barker: J.A.P.A., Sci. Ed., vol. 45, No. 8, August 1956, pp. 527–9.

Stark et al.: J.A.P.A., Sci. Ed., vol. 47, No. 3, March 1958, pp. 223–6.

Ward: J.A.P.A., Sci. Ed., May 1950, pp. 265–6.

Goldstein: J.A.P.A., Pract. Ph. Ed., vol. 15, No. 1, January 1954, pp. 41–44.

Carbowax, Booklet 4772C, Union Carbide Chemicals Co., New York (September 1957), pp. 13–14.